United States Patent Office 3,652,570
Patented Mar. 28, 1972

3,652,570
1 CYCLOALKYLAMINO 3,4 DIHYDRO ISOQUINOLINES
Maurice Ward Gittos, Slough, John William James, Langley, and John Pomfret Verge, Middle Assendon, near Henley, England, assignors to Aspro-Nicholas Limited, London, England
No Drawing. Filed Mar. 10, 1969, Ser. No. 805,868
Claims priority, application Great Britain, Mar. 9, 1968, 11,633/68
Int. Cl. C07d 35/14
U.S. Cl. 260—288 R  5 Claims

ABSTRACT OF THE DISCLOSURE

Novel 1-amino derivatives of 3,4-dihydroisoquinoline and 4,5-dihydro-3H-2-benzazepines are provided together with a process by which they may be prepared from the corresponding 1-thio; lower alkylthio- or arylthio-imidates. The 1-amino derivatives possess hypotensive activity.

---

This invention relates to certain new heterocyclic amines and to a novel process for their manufacture.

According to the present invention there are provided 1-amino derivatives of a 3,4-dihydroisoquinoline or 4,5-dihydro-3H-2-benzazepine compound, and acid addition salts, quaternary ammonium derivatives and N . . . N ring closed derivatives thereof.

By N . . . N ring closed derivatives we mean to include those compounds wherein the nitrogen of the amino group and the nitrogen of the isoquinoline of benzazepine compound are linked together by a 2- or 3-carbon, saturated or unsaturated alkylene chain, one of which carbons may be replaced by a nitrogen.

The benzene ring of the isoquinoline or benzazepine compound may be substituted by one or more of the same or different hydroxyl, halogen (including the pseudo-halogen trifluoromethyl), alkyl, alkoxy, amino, lower alkylamino, di-lower alkylamino, lower alkylene-dioxy, aralkyl, alkyl or arylsulphonamido groups, and the carbon atoms of the heterocyclic ring of the isoquinoline or benzazepine compound may be substituted by lower alkyl.

The 1-amino group is substituted by one or two of the same or different hydrogen, amino, aliphatic, cyclo-aliphatic, cycloaliphatic-aliphatic, heteroaliphatic, aromatic, aromatic-aliphatic, heterocyclic or heterocyclic-aliphatic radicals, or two substituents on the 1-amino group may together with the nitrogen of that group form a heterocyclic group of from 5 to 8 ring atoms, optionally containing a further hetero atom such as an oxygen, sulphur or nitrogen atom.

In the case of the N . . . N ring closed derivatives, the resultant ring may be substituted by oxy (i.e. to form a ketone), alkyl, amino, lower acyl or guanidino.

More particularly, the present invention provides compounds of the formula:

Ia    Ib wherein
$R_1$ and $R_2$, which may be the same or different, are hydrogen, hydroxyl, halogen, lower alkyl, lower alkoxy, amino, lower alkylamino, di-lower alkylamino, phenyl-lower alkyl, lower alkylsulphonamido or phenylsulphonamido, or $R_1$ and $R_2$ together represent methylene- or ethylenedioxy;
$R_3$ is hydrogen or lower alkyl;
$n$ is 2 or 3;
$R_5$ and $R_6$, which may be the same or different, are hydrogen; amino; cycloalkyl; cycloalkyl-alkyl optionally substituted by hydroxy, halogen, alkyl, alkoxy or amino; heterocyclic (of from 5 to 8 ring atoms and optionally containing a further oxygen, sulphur or nitrogen atom) or heterocyclic-lower alkyl optionally substituted by hydroxy, halogen, alkyl, alkoxy or amino; hydroxy; cyano; lower alkoxycarbonylamino; the group $$-\left(\underset{\underset{CH}{|}}{\overset{R_7}{}}\right)_m-\overset{X}{\underset{\|}{C}}-R_8$$

wherein $m$ is an integer from 0 to 5, $R_7$ is hydrogen or lower alkyl, X is oxygen or sulphur and $R_8$ is hydroxy (when $m$ is at least 1), alkyl, alkoxy, aryl, aryloxy or amino optionally substituted by lower alkyl, phenyl or phenyl-lower alkyl;

or the group $$-(CH_2)_p-NH-\overset{Y}{\underset{\|}{C}}-N\overset{R_9}{\underset{R_{10}}{\diagdown}}$$

wherein Y is oxygen, sulphur, thioalkyl, imino, alkylamino or guanidino, and $R_9$ and $R_{10}$, which may be the same or different, are hydrogen, lower alkyl, phenyl-lower alkyl; and $p$ is 0 or 1;

or $R_5$ and $R_6$, together with the adjacent nitrogen, represent a heterocyclic ring of from 5 to 8 ring atoms optionally containing a further hetero atom such as oxygen, sulphur or nitrogen and optionally substituted by lower alkyl, aryl or aryl-lower alkyl; and Z represents a saturated or unsaturated alkylene chain of 2 or 3 carbons, one of which carbons may be replaced by a nitrogen and which chain may be substituted where possible by oxy, lower alkyl, amino, lower acyl or guanidino.

Examples of suitable alkoxy and aryloxy radicals are methoxy, ethoxy, propoxy, butoxy, amyloxy (i.e. pentyloxy), hexyloxy, vinyloxy, allyloxy, but-1-enyloxy, but-2-enyloxy, pent-2-enyloxy, 4,4-dimethylbut-1-enyloxy, hex-3-enyloxy, hex-1,3-dienyloxy, 3-ethylbut-1-enyloxy, 3-vinylbut-2-enyloxy, ethynyloxy, prop-2-ynyloxy, prop-1-ynyloxy, but-1-ynyloxy, 3,3-dimethylprop-1-ynyloxy, pent-3-ynyloxy, 3-ethylbut-4-en-1-ynyloxy, phenoxy, benzyloxy, naphthyloxy, 3-chlorophenoxy, 2,3-dimethoxyphenoxy, 2-methylnaphthyloxy, 4-aminophenoxy and the like.

Examples of suitable alkyl radicals are methyl, ethyl, propyl, butyl, amyl, hexyl, heptyl, octyl, nonyl, decyl, undecyl, dodecyl, ethenyl, ethynyl, prop-1-enyl, prop-2-enyl (i.e. allyl), prop-1-ynyl, prop-2-ynyl, but-1-enyl, but-1-ynyl, but-2-enyl, but-2-ynyl, but-3-enyl, pent-1-enyl, pent-2-enyl, pent-2-ynyl, pent-4-ynyl, 2-methylbut-1-enyl, 3-methylbut-1-ynyl, 2-methylbut-2-enyl, 1-1-dimethylprop-2-enyl, hex-1-enyl, hex-1-ynyl, hex-3-enyl, hex-3-ynyl, hex-4-ynyl, hex-5-enyl, 3,3-dimethylbut-1-enyl, 3-ethylbut-1-ynyl, 2,3-dimethylbut-2-enyl, 3-methyl-3-ethylprop-1-ynyl, 1-methyl-1-ethylprop-2-enyl, pent-1,3-dienyl, hexa-1,3-dien-5-ynyl, pent-1-en-4-ynyl, pent-2-en-4-ynyl, 2,3-dimethylbuta-1,3-dienyl and the like.

Examples of alkyl radicals substituted by one or more hydroxy, amino, halogen, alkoxy or lower acyl radicals are acetylmethyl, diacetylmethyl, 2-hydroxyethyl, 2-hydroxypropyl, 2-aminoethyl, 2-aminopropyl, 3-hydroxypropyl, 4-hydroxybutyl, 4-aminobutyl, 5-hydroxyamyl, 4-hydroxyamyl, 4-aminoamyl, 4-hydroxyhexyl, 1-methyl-2-hydroxyethyl, 2 - methyl - 3-hydroxypropyl, 2-methyl-3-aminopropyl, 1 - methyl - 3-hydroxypropyl, 3-methyl-4-aminobutyl, 3-methyl-5-aminopentyl, 2-hydroxyethenyl, 3-hydroxyprop-1-enyl, 3-aminoprop-1-enyl, 1-methyl-2-hydroxyvinyl, 4-hydroxybut-1-ynyl, 4-aminobut-2-ynyl, 5-hydroxypent-1-enyl, 5-hydroxypent-2-ynyl, 5-aminopent-3-ynyl, 2-aminomethylbut-2-enyl, 1,1-dihydroxymethylprop - 2 - enyl, 3,3 - dihydroxymethylbut-1-enyl, 3-(2-hydroxyethyl) but-1-ynyl, 5-hydroxypent-1,3-dienyl, 6-aminohex - 1,4 - dienyl, 6 - hydroxyhex - 1 - en-3-yl, 2-chlorethyl, 2-bromoethyl, 2-iodoethyl, 2-fluoroethyl, 2-chloropropyl, 3-bromopropyl, 3-fluoropropyl, 3-chlorobutyl, 5-bromoamyl, 4-trifluoromethylbutyl, 6-iodohexyl, 1-trifluoromethylethyl, 2-bromomethyl-3-bromopropyl, 1-methyl-3-chloropropyl, 3-trifluoromethylbutyl, 3-methyl-5 - iodopentyl, 2-bromo-methyl-5-bromopentyl, 3-chloroprop-2-enyl, 4-bromobut-1-ynyl, 2-ethoxyethyl, 2-butoxyethyl, 3-methoxypropyl, 3-butoxypropyl, 4-ethoxybutyl, 5-propoxyamyl, 4-methoxyhexyl, 2-methyl-3-ethoxypropyl, 2,2-diethoxyethyl, 2,3-diethoxypropyl, 3-methyl-4-ethoxybutyl, 3-methoxy-5-ethoxypentyl, 2-ethoxyethenyl, 2-ethoxyethynyl, 3-methoxyprop-1-enyl, 1-methyl-2-ethoxyvinyl, 4-ethoxybut-2-ynyl, 5-ethoxypent-1-enyl, 3,4-dimethoxybut-1-ynyl, 6-ethoxyhex-2-ynyl, 3-(2'-ethoxyethyl) but-1-ynyl, 6-methoxyhex-1,4-dienyl and 5-ethoxypent-2-en-4-ynyl.

Examples of suitable cycloalkyl radicals include cyclopropyl, cyclobutyl, cyclopentyl, cyclohexyl, cycloheptyl and cyclooctyl.

Examples of suitable alkylene-dioxy radicals include methylene-dioxy, ethylene-dioxy, propylene-dioxy and butylene-dioxy.

Examples of suitable alkyl and di-alkylamino radicals include dimethylamino, diethylamino, methylamino, ethylamino, propylamino, butylamino, N-methyl-N-butylamino, N-allylamino, N-prop-2-ynylamino, N-methyl-N-prop - 2 - ynylamino, N - ethyl - N - but - 1 enylamino and the like.

Examples of suitable alkyl and arylsulphonamido include especially methylsulphonamido, ethylsulphonamido, propylsulphonamido, allylsulphonamido, butylsulphonamido, prop-2 - ynylsulphonamido, but - 1-enylsulphonamido, hexylsulphonamido, phenylsulphonamido, α-naphthylsulphonamido, benzylsulphonamido, chlorophenylsulphonamido, methoxyphenylsulphonamido, tolysulphonamido and the like.

Examples of suitable aryl and aralkyl radicals optionally substituted by hydroxy, amino, halogen, alkyl or alkoxy groups include phenyl, tolyl, xyly, cumenyl, 2,3 dimethoxyphenyl, chlorophenyl, 2,4 - dibromophenyl, aminophenyl, hydroxyphenyl, α-naphthyl, 2-methyl-α-naphthyl, benzyl, cinnamyl, phenethyl, styryl, trityl, o-tolymethyl, 2,3-xylylmethyl, m-cumenylmethyl, mesitylmethyl, 2,4 - dimethoxybenzyl, 2,3,6 - trimethoxybenzyl, β - naphthylmethyl, γ - phenylpropyl, 4 - phenylbutyl 4-(o-tolyl)butyl, 4 - (3',4'-xylyl)butyl, 4-(2',4'-dimethoxyphenyl) butyl, 4-(α-naphthyl)butyl, 1-methyl-2-phenylethyl, 5-phenylamyl, 2-methyl-3-phenylpropyl, 1-methyl-3 - (α - naphthyl) propyl, 4 - phenylbut - 1 - enyl, 4-(β-napthyl)but - 2 - enyl, 5 - phenylpent-2-ynyl, 2-benzylbut - 1 - enyl, 3,3 - dibenzylbut-1-ynyl, 6-phenylhex-1-en-3-ynyl, and 4-(m-cumenyl) buta-1,3-dienyl.

Example of suitable heterocyclic and heterocyclicalkyl radicals optionally substituted by hydroxy, halogen, alkyl, alkoxy or amino groups are imidazolidinyl, imidazolinyl, pyrazolidinyl, pyrazolinyl, piperidyl (i.e. piperidino), homopiperidyl, thiazolinyl, thiazolyl, homopiperazinyl, homomorpholinyl, piperazinyl, morpholinyl (i.e. morpholino), thiazinyl, thiazolidinyl, pyrrolyl, imidazolyl, pyrazolyl, pyrrolidinyl (i.e. pyrrolidino), pyrrolinyl, piperidylmethyl, morpholinylethyl, 4-methylpiperazinyl, 2-methoxypiperidyl, 3-aminopyrrolidinyl, 3-chloropiperidyl, 3-hydroxypyrrolidinyl, 2,3-dimethoxymorpholinyl 4-phenylpiperazinyl and the like.

A particularly preferred group of compounds of the present invention have the Formula Ia or Ib above wherein $R_1$ and $R_2$, which may be the same or different are hydrogen, hydroxy, halogen, methyl, ethyl, propyl, butyl, methoxy, ethoxy, propoxy, butoxy, amino, methylamino, ethylamino, dimethylamino, diethylamino, benzyl, phenethyl, methylsulphonamido, ethylsulphonamido or phenylsulphonamido, or $R_1$ and $R_2$ together represent methylene- or ethylene-dioxy;

$R_3$ is hydrogen and $n$ is 2 or 3;

$R_5$ and $R_6$, which may be the same or different, are hydrogen; hydroxy; cyano; amino; cycloalkyl or cycloalkyllower alkyl (the cycloalkyl moiety of which groups has 3 to 6 carbons) lower alkyl optionally substituted by hydroxy, halogen, amino, lower acyl or lower alkoxy; phenyl, phenoxy-lower alkyl or phenyl-lower alkyl optionally substituted by hydroxy, halogen, amino, lower alkyl or lower alkoxy; heterocyclic or heterocyclic-lower alkyl (of 5 to 7 ring atoms and optionally containing a further oxygen or nitrogen atom) optionally substituted by hydroxy, halogen, amino, lower alkyl or lower alkoxy; ethoxycarbonylamino; the group

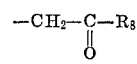

wherein $R_8$ is lower alkyl, lower alkoxy or amino optionally substituted by lower alkyl; the group

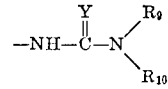

wherein Y is oxygen, imino, sulphur, lower alkylimino or guanidino, and $R_9$ and $R_{10}$, which may be the same or different, are hydrogen or lower alkyl, or $R_5$ and $R_6$, together with the adjacent nitrogen, represent a heterocyclic ring of 5 to 7 ring atoms optionally containing a further nitrogen or oxygen and optionally substituted by lower alkyl, phenyl or phenyl-lower alkyl; and Z represents a saturated or unsaturated alkylene chain of 2 or 3 carbons, one of which carbons may be replaced by a nitrogen, and which chain may be substituted where possible by oxy, methyl, ethyl, acetyl, propionyl or amino.

According to a further feature of the present invention there is provided a novel process for preparing 1-amino derivatives of a 3,4-dihydroisoquinoline or 4,5-dihydro-3H-2-benzazepine compound, which compounds may be isolated either per se or as acid addition salts or quaternary ammonium derivatives thereof, and N . . . N ring closed derivatives (as hereinbefore defined) of said isoquinoline or benzazepine compounds, which process comprises reacting a 1-thio-, lower alkylthio- or arylthio-imidate of a 3,4-dihydroisoquinoline or 4,5-dihydro-3H-2-benzazepine compound with an amine.

The reaction is normally carried out in a polar solvent such as, for example, dimethylformamide, dimethylacetamide or dimethylsulphoxide and an elevated reaction temperature, for example above 90° C. is preferable in order to shorten reaction times (usually from about 1 to 6 hours although longer reaction times are of course possible). Preferred imidates for use in the reaction are 1-methylthioimidate and 1-ethylthioimidate.

Thereafter, where an N . . . N ring closed derivative is required, a corresponding 1-secondary amino compound prepared as above and having a single substituent on the amine nitrogen terminating in a functional group susceptible to a cyclisation reaction, is cyclised in a manner known per se such as, for example, by heat, the action of acid or alkali or other suitable reagents such as thionyl chloride, phosphorus trichloride and the like. Examples of the functional groups referred to above are ethynyl, hydroxyl, halogeno, dialkoxy, acyl, alkoxycarbonyl, thioamido, and amidino. The cyclosation reaction may if desired be carried out without the prior isolation of the corresponding 1-amino compound. In the following table, examples are given of suitable amino substitutents and the N . . . N ring closed compounds produced by cyclising said amino substituents (partial formulae shown):

| 1-amino compound | Ring-closed derivative |
|---|---|
| $\diagdown \diagup N \diagdown C \diagdown H-N-R_6$ | cyclisation $\diagdown \diagup N \diagdown C \diagup Z \atop N - - - $ |
| $R_6$ | $Z$ |
| $-CH_2-C=CR$ | $CH_2-R \atop -CH=C-$ |
| $-CH_2-CH_2-OH$ or Cl<br>$-CH_2-CH_2-CH_2-OH$ or Cl<br>$-CH-CH_2-OH \atop R$ | $-CH_2-CH_2-$<br>$-CH_2-CH_2-CH_2-$<br>$-CH-CH_2- \atop R$ |
| $-NH-COO$ Alkyl | $-NH-C- \atop \|\| \atop O$ |
| $-NH-C-NH_2 \atop \|\| \atop S$ | $-N=C- \atop \| \atop NH_2$ |
| $-NH-C-NH_2 \atop \|\| \atop NH$ | $-N=C- \atop \| \atop NH_2$ |
| $-CH_2-C-NH_2 \atop \|\| \atop S$ | $-CH=C- \atop \| \atop NH_2$ |
| $-CH_2-CH(O\ Alkyl)_2$<br>$-CH_2-CO-Alkyl$ | $-CH=CH-$<br>$-CH=C- \atop \| \atop Alkyl$ |
| $-CH-CO-Alkyl \atop \| \atop Acyl$ | $-C=C- \atop \| \quad \| \atop Acyl \ \ Alkyl$ |

If desired, reaction of a compound in which Z is a chain substituted by amino with an S-methylthiouronium halide will produce the corresponding guanidino compound.

The thioimidate starting materials of the present invention are usually prepared in one of two ways. Thus they may be prepared by reacting a substituted or unsubstituted phenethyl- or phenopropyl-isothiocyanate (obtainable by the general method described in J.A.C.S., 81, 4328) with (a) when the phenyl group is deactivated, aluminium chloride; or (b) when the phenyl group is activated, polyphosphoric acid; to form the desired 3,4-dihydroisoquinoline- or 4,5-dihydro-3H-2-benzazepine-1-thioimidate, and when a lower alkyl thioimidate is required, thereafter reacting the unsubstituted thioimidate with a suitable alkylating agent such as an alkyl halide, sulphate or sulphonate.

Alternatively, the thioimidate isoquinoline starting materials may be prepared directly by reacting a mixture of lower alkyl- or aryl-thiocyanate and stannic chloride with a substituted or unsubstituted 2-chloroethylbenzene.

As mentioned above, the compounds may be isolated either per se or as acid addition salts or quaternary ammonium derivatives thereof.

The acid addition salts are preferably the pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example, glycollic, maleic, hydroxymaleic, malic, tartaric, citric, salicylic, o-acetyloxybenzoic, nicotinic or isonicotinic acid, or organic sulphonic acids for example methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric or oxalic acid; they may serve as intermediates in the purification of the compounds or in the preparation of other, for example pharmaceutically acceptable, acid addition salts, or are useful for identification, characterization or purification of the bases.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Quaternary ammonium derivatives of the compounds of this invention are particularly those formed by reaction with lower alkyl halides, for example, methyl, ethyl, or propyl chloride, bromide or iodide; di-lower alkyl sulphates, for example dimethyl or diethyl sulphate; lower alkyl lower alkane sulphonates, for example methyl or ethyl methane sulphonate or ethane sulphonate; lower alkyl aryl sulphonates, for example methyl or ethyl p-toluene sulphonates; and phenyl-lower alkyl halides, for example benzyl or phenethyl chloride, bromide or iodide. Also included are the quaternary ammonium hydroxides and the quaternary ammonium compounds having as anions those of other inorganic or organic acids, for example those of the acids used for the preparation of the previously-mentioned acid addition salts.

The compounds of the present invention are useful as intermediates in the preparation of other compounds having pharmaceutical activity and are also useful in their own right for their pharmacological properties. Such properties include cardiovascular activity and in particular hypotensive activity.

Insofar as is presently known, only three of the foregoing compounds have been described hitherto. These compounds are 6,7-dimethoxy-3,4-dihydroisoquinolines substituted by a 1-methyl-1-phenylamino, 1-anilino or 1-(4'-ethoxyanilino) group. Accordingly, such compounds do not form a part of the compound aspect of this invention. However, no pharmacological activity has previously been ascribed to these compounds so that they are included in the method and composition aspects of the invention.

In the method aspect of the invention, there is provided a method of treating hypertension in animals comprising administering to said animals a hypotensively effective amount of a dihydroisoquinoline or dihydrobenzazepine as hereinbefore defined or an acid addition salt, quaternary ammonium derivative or N . . . N ring closed derivative thereof.

In the composition aspect of the invention there are provided pharmaceutical formulations in which form the active compounds of the invention will normally be utilised. Such formulations are prepared in a manner well known in the pharmaceutical art and usually comprise at least one active compound of the invention in admixture or otherwise in association with a pharmaceutically acceptable carrier therefor. For making these formulations the active ingredient will usually be mixed with a carrier, or diluted by a carrier, or enclosed or encapsulated in a capsule, sachet, cachet, paper or other container. A carrier or diluent may be a solid, semi-solid or liquid material which serves as a vehicle, excipient or medium for the active ingredient. Some examples of such diluents or carriers are lactose, dextrose, sucrose, sorbitol, mannitol, starches, gum acacia, calcium phosphate, liquid paraffin, cocoa butter, oil of theobroma, alginates, tragacanth, gelatin, syrup B.P., methyl cellulose, polyoxyethylene sorbitan monolaurate, methyl- and propylhydroxybenzoate, talc, magnesium stearate or mineral oil.

The formulations of the invention may be adapted for enternal or parenteral use and may be administered to a subject requiring treatment, for example an animal suffering hypertension, in the form of tablets, capsules, suppositories, solutions, suspensions or the like. The dosage required for the treatment of any animal will usually fall within the range of about 0.01 to 250 mg./kg. and for example in the treatment of adult humans, each dosage of active ingredient will normally be from about 0.01 to 15 mg./kg. The formulations of the invention may therefore be provided in dosage unit form, preferably each dosage unit containing from 1 to 1000 mg. more advantageously from 5 to 500 mg. and most preferably from 10 to 250 mg. of the active ingredient of the invention.

The following examples illustrate the preparation of the thioimidate intermediates of the present invention:

EXAMPLE 1

2-(3',4'-dimethoxyphenyl) ethyl isothiocyanate B.P. 138–140° C./0.2 mm., was prepared by the method described in J.A.C.S., 81, 4328. This material (54.3 g.) was added to stirred polyphosphoric acid (350 g.) and heated to 75° C. for 1½ hours. The mixture was poured into 1½ litres of water and stirred well to give a pale yellow precipitate. The latter and the mother liquor were extracted three times with chloroform, the extracts filtered through a bed of anhydrous magnesium sulphate and evaporated to dryness. The residue was washed well with petroleum ether and dried to yield 6,7-dimethoxy-1,2,3,4-tetrahydro-1-isoquinolthione, M.P. 223° C.

EXAMPLE 2

The compound of Example 1 (42.3 g.) was refluxed with dimethyl sulphate (25 g.) in chloroform (200 ml.) for 2½ hours. After standing overnight, water (200 ml.) was added and the mixture shaken, made strongly basic and shaken again. The chloroform layer was separated, dried and evaporated at room temperature to give a yellow solid. The solid was extracted with warm ether, the extracts treated with activated charcoal and evaporated to dryness to yield 1-methylthio-6,7-dimethoxy-3,4-dihydroisoquinoline, M.P. 94–6° C. The latter compound was dissolved in ether, the solution filtered and then treated with ethereal hydrochloric acid to yield the base hydrochloride which, on recrystallisation from ethanol/ether, melted at 190–2° C. (dec.)

EXAMPLE 3

To a stirred suspension of powdered aluminium chloride (61.6 g.) in tetrachloroethane (200 ml.) was added 2-(3',4'-dichlorophenyl) ethyl isothiocyanate (47.3 g., 0.204 M) at room temperature. After stirring at room temperature for around 5 minutes the mixture was warmed to 70° C. for 5 minutes during which time there was no perceptive change. The reaction was concluded at 110° C.; effective commencement of cyclisation was manifest by sudden dissolution of the suspended material after about 2 minutes at 110° C. The reaction was then complete within minutes. After working up in the usual way, 28 g. of 6,7-dichloro-1,2,3,4-tetrahydroisoquinoline-1-thione was obtained.

EXAMPLE 4

Ethyl thiocyanate (39 g.) was added with stirring to anhydrous stannic chloride (139.2 g., 62.5 ml.). The temperature rose to 78° C. accompanied by formation of a white crystalline complex. 2-phenyl ethyl chloride (75 g.) was added and there was an induction period before the temperature rose to 135° C. On falling back to 110° C. the mixture was maintained at this temperature for 3 hours by heating in an oil bath. White fumes were evolved during this period. The hot dark reaction mixture was poured into 1 litre of approximately 5 N sodium hydroxide solution and stirred vigorously until the solid complex had been decomposed and dissolved to form a dark brown oil. After cooling the mixture was extracted with ether. The ethereal solution was extracted with 5 N hydrochloric acid and the aqueous layer charcoaled and filtered before basifying with sodium hydroxide solution and again extracting with ether. The ethereal solution was dried and the ether removed by distillation, the residue being distilled under reduced pressure to yield 1-ethylthio-3,4-dihydroisoquinoline, B.P. 89–95° C./0.1 mm.

EXAMPLE 5

To a stirred suspension of $AlCl_3$ (300 g.) in tetrachloroethane (1000 ml.) was added γ-phenyl-n-propylisothiocyanate (177 g.) at a rate such that the temperature was maintained below 50° C. The mixture was heated to 120° C. during which time the colour became very dark. When the temperature of the mixture reached 110° C., a large mass of solid separated accompanied by a slight exotherm. The solid was soon broken up and heating was continued at 120° C. for a total of 1 hour. The black mixture was quenched onto ice/HCl and a large quantity of black granular solid was filtered off. The solid was repeatedly triturated and washed with tetrachlorethane and the liquor combined with the main tetrachloroethane liquor. The extract was water-washed and dried over $MgSO_4$. The solvent was almost completely removed and light petrol was added to precipitate the product, a buff coloured powder, which was filtered, washed well with petrol and dried to yield 1,2,4,5-tetrahydro-3H-2-benzazepine-1-thione.

EXAMPLE 6

Dimethyl sulphate (30 ml.) was added slowly to a refluxing solution of 1,2,4,5-tetrahydro-3H-2-benzazepine-1-thione (52 g.) in benzene (250 ml.). The solution was maintained at reflux temperature for 1½ hours during which time a dark oil gradually separated. Water was added to the cooled mixture to dissolve the product. The benzene layer was separated and re-extracted several times with water. Combined aqueous extracts were back-washed with benzene, basified with potassium carbonate and the liberated oil extracted into ether. The ethereal solution was dried over anhydrous potassium carbonate, the ether stripped and the residue distilled in vacuo to yield 1 - methylthio - 4,5 - dihydro - 3H - 2 - benzazepine, B.P. 102° C./1.0 mm.

The following examples illustrate the preparation of certain specific compounds of the invention:

EXAMPLE 7

6,7 - dimethoxy - 1 - methylthio - 3,4 - dihydroisoquinoline (7.12 g., 0.03 mole) and propargylamine hydrochloride (2.75 g., 0.03 mole) were dissolved in dimethyl formamide (25 ml.) and heated to 120° C. for 1½ hours, methyl mercaptan being evolved. The reaction mixture was stood at room temperature for 2 days during which time a yellow solid crystallized out. Excess ether was added to complete precipitation and the yellow solid filtered off, washed with ether and dried. After recrystallization from ethanol/ether and then ethanol, 6,7-dimethoxy-1-propargylamino-3,4-dihydroisoquinoline hydrochloride, M.P. 208–10° C., was obtained.

EXAMPLE 8

6,7 - dimethoxy-1-methylthio - 3,4 - dihydroisoquinoline hydrochloride (8.21 g., 0.03 mole) and cyclopropylamine (1.71 g., 0.03 mole) were dissolved in dimethylformamide (30 ml.) and heated to 130° C. for 2½ hours. The mixture was cooled and excess ether added to complete precipitation. The solid was collected, washed with ether, dried and then recrystallized from ethanol/ether to yield 1-cyclopropylamino-6,7-dimethoxy - 3,4 - dihydroisoquinoline hydrochloride M.P. 243–4° C. (dec.). The reaction also proceeded very satisfactorily when the 1-ethylthio starting material was used.

EXAMPLE 9

By the method of Example 8 but using 3,4-dimethoxybenzylamine (4.18 g., 0.025 mole), there was prepared, after recrystallization from ethanol/ether, 1-(3',4'-dimethoxybenzyl)amino - 6,7 - dimethoxy - 3,4 - dihydroisoquinoline hydrochloride, M.P. 250–2° C.

EXAMPLE 10

By the method of Example 7 but using 1-methylthio-3,4-dihydroisoquinoline, there was prepared, after recrystallisation from methanol/ether, 1-propargylamino-3,4-dihydroisoquinoline hydrochloride M.P. 214–217° C.

EXAMPLE 11

By the method of Example 7 but using 1-methylthio-3,4-dihydroisoquinoline, there was prepared, after recrystallization from isopropyl alcohol/ether, 1-cyclopropylamino - 3,4 - dihydroisoquinoline hydrochloride, M.P. 193–196° C.

EXAMPLE 12

1 - methylthio - 3,4 - dihydroisoquinoline hydrochloride (5.34 g., 0.025 mole) and thiosemicarbazide (2.3 g., 0.025 mole) were dissolved in dimethylformamide and warmed for 1½ hours on a water bath, methyl mercaptan being evolved rapidly. The solution was cooled, stirred with ether (2× 50 ml.) and finally triturated with acetone (50 ml.) to yield a white solid. After recrystallization from methanol/ether, 1-[1'-(3',4'-dihydroisoquinolyl)]-3-thiosemicarbazide hydrochloride, M.P. 190–3° C., was obtained.

EXAMPLE 13

1 - methylthio - 3,4 - dihydroisoquinoline hydrochloride (10.7 g., 0.05 mole) and aminoacetaldehyde diethylacetal (6.7 g., 0.05 mole) were mixed with dimethylformamide (5 ml.) and heated at 100° C. for 3 hours, methyl mercaptan being evolved. After cooling, the product was dissolved in water (40 ml.) and basified with sodium hydroxide. The precipitated oil was extracted with ether, extracts washed with water and shaken with dilute hydrochloric acid. The aqueous layer was separated and basified. The oil obtained was taken up in ether, the ether extracts dried and evaporated to yield 1-(2',2'-diethoxyethylamino)-3,4-dihydroisoquinoline in a brown gum. The gum was dissolved in 5 N hydrochloric acid (20 ml.) and heated at 100° C. for ½ hour. The solution was basified and the oil obtained taken up in dry ether. The ether solution was treated with ethereal hydrochloric acid to yield [2,1-a]imidazo-5,6-dihydroisoquinoline hydrochloride, M.P. 251–2° C.

EXAMPLE 14

1-methylthio-6,7-dimethoxy-3,4-dihydroisoquinoline hydrochloride (6.84 g., 0.025 mole) and aminoacetaldehyde diethylacetal (3.33 g. 0.025 mole) were heated with stirring to 135° C. in dimethylformamide (25 ml.) until no more methyl mercaptan was evolved. The mixture was cooled and, on adding a large excess of ether, a brown solid was precipitated which, on recrystallization from methanol/ether yielded [2,1 - a]imidazo-8,9-dimethoxy-5,6-dihydroisoquinoline hydrochloride, M.P. 255–6° C. (dec.). On treatment with sodium hydroxide and recrystallization from benzene/petroleum ether, the base (M.P. 150–2° C.) was obtained.

EXAMPLE 15

1-methylthio - 3,4 - dihydroisoquinoline hydrochloride (10.68 g., 0.05 mole), dry redistilled piperidine (15 ml.) and dimethylformamide (15 ml.) were heated to 120–5° C. for 3 hours. The mixture was cooled, diluted with water (60 ml.), extracted with ether (2× 75 ml.), the extracts dried and evaporated. The oil remaining was distilled in vacuo. After a forerun of piperidine, there was obtained a thick oil, B.P. 100–105° C./0.05 mm. This oil was dissolved in dry ether (100 ml.) and on adding an excess ethereal hydrochloric acid, a gummy precipitate was obtained which solidified on stirring. The precipitate was filtered off, extracted with hot acetone, cooled and the remaining solid filtered off and dried to yield 1-piperidino-3,4-dihydroisoquinoline hydrochloride, M.P. 228–230° C.

EXAMPLE 16

1-methylthio - 3,4 - dihydroisoquinoline hydrochloride (10.7 g., 0.05 mole) was dissolved in a solution of dry morpholine (15 ml.) in dimethylformamide (15 ml.). The mixture was stirred and heated to 120–130° C. for 1 hour. On cooling and diluting with ether, a crystalline precipitate of morpholine hydrochloride was obtained. The mother liquor was evaporated and, on stirring with water (100 ml.), a white solid was obtained. This was dissolved in dry ether and ethereal hydrochloric acid added to precipitate the hydrochloride salt which was dissolved in a minimum of boiling acetone. On adding ether, a crystalline solid precipitated which, after washing with acetone and drying, gave 1-morpholino-3,4-dihydroisoquinoline hydrochloride, M.P. 216–7° C.

EXAMPLE 17

The method of Example 9 was repeated except that 6,7-dimethoxy-1,2,3,4-tetrahydro-1-isoquinolthione was used in place of the 1-methylthioimidate. The 6,7-dimethoxy-1-(3',4' - dimethoxybenzyl)amino-3,4-dihydro-isoquinoline hydrochloride obtained was identical (melting point and mixed melting point) to that obtained by the method of Example 9. The reaction was also found to proceed satisfactorily using 1-phenylthio-6,7-dimethoxy-3,4-dihydroisoquinoline (prepared by reacting a mixture of phenylthiocyanate and stannic chloride with 2'-chloroethyl-3,4-dimethoxy-benzene).

EXAMPLE 18

By the method of Example 11 but using ethanolamine, there was prepared 1-(2'-hydroxyethylamino)-3,4-dihydroisoquinoline hydrochloride, M.P. 160–161° C.

EXAMPLE 19

By the method of Example 11 but using 2-chloroethylamine, there was prepared 1-(2'-chloroethylamino)-3,4-dihydroisoquinoline hydrochloride, M.P. 194–6° C. The latter compound was also prepared by refluxing the corresponding 2-hydroxyethylamino compound with thionyl chloride for 1 hour followed by distillation.

EXAMPLE 20

The compound of Example 19 (9.3 g.) in aqueous solution was basified with potassium carbonate and the resultant oil extracted with ether. The ethereal solution obtained was dried and distilled, the residue refluxed with ethanol for ½ hour and the ethanol then distilled off. The resultant oil was treated with ethereal hydrochloric acid to yield 2,3,5,6-tetrahydro[2,1-a]imidazoisoquinoline hydrochloride, M.P. 220–2° C. The same compound was obtained by cyclising the 2-hydroxyethylamino derivative of Example 18.

EXAMPLE 21

1 - methylthio - 4,5-dihydro-3H-2-benzazepine (7.6 g.) and cyclo propylamine hydrochloride (3.9 g.) were dissolved in dry dimethyl formamide (25 ml.) with gentle warming. The mixture was stirred at 130–140° C. during 3½ hours. A solid crystallised from the cooled solution and precipitation was completed by the addition of ether. The filtered solid was triturated with a small quantity of methyl cyanide to remove coloured impurities, and after drying, was recrystallised from isopropanol/ether to yield 1-cyclopropylamino-4,5-dihydro-3H-2-benzazepine hydrochloride, M.P. 243–245° C.

EXAMPLE 22

By suitable choice of reactants and using the methods exemplified above, the following compounds were prepared:

1-hydrazino-3,4-dihydroisoquinoline hydrochloride, M.P. 202° C.
1-cyclopropylmethylamino-3,4-dihydroisoquinoline hydrochloride, M.P. 120–2° C.
1-pyrrolidino-3,4-dihydroisoquinoline, B.P. 100° C./0.05 mm.
6,7-dihydro-5H-[2,1-a]imidazo-2-benzazepine hydrochloride, M.P. 213–4° C. (prepared according to the method of Example 13 by first preparing 1-(2',2'-diethoxyethylamino)-4,5-dihydro-3H-2-benzazepine followed by cyclisation thereof)
3-methyl-5,6-dihydro[2,1-a]imidazoisoquinoline hydrochloride, M.P. 306–7° C. (prepared by cyclising the compound of Example 10 using boiling glacial acetic acid in the presence of a copper catalyst)
1-cyclopropylamino-6,7-dichloro-3,4-dihydroisoquinoline hydrochloride M.P. 272–3° C.
1-cyclopropylamino-7-chloro-3,4-dihydroisoquinoline hydrochloride, M.P. 121° C.
1-propargyl-4,5-dihydro-3H-2-benzazepine hydrochloride M.P. 194–5° C.
1-(4'-phenylpiperazine-1'-yl)-3,4-dihydroisoquinoline, M.P. 132° C.
1-ethylamino-3,4-dihydroisoquinoline hydrochloride, M.P. 167° C.
1-isopropylamino-3,4-dihydroisoquinoline hydrochloride, M.P. 227° C.
1-n-propylamino-3,4-dihydroisoquinoline, M.P. 71–3° C.
1-allylamino-3,4-dihydroisoquinoline hydrochloride, M.P. 145–6° C.
1-(2'-phenylethylamino)-3,4-dihydroisoquinoline hydrochloride M.P. 167–70° C.
1-(3',4'-dimethoxybenzylamino)-3,4-dihydroisoquinoline hydrochloride, M.P. 193–6° C.
1-(2'-phenoxyethylamino)-3,4-dihydroisoquinoline hydrochloride, M.P. 174° C.
1-(2'-fluoroanilino)-3,4-dihydroisoquinoline, M.P. 141–3° C.
1-cyclopentylamino-3,4-dihydroisoquinoline, M.P. 128–30° C.
1-benzylamino-3,4-dihydroisoquinoline hydrochloride, M.P. 234–6° C.
1-anilino-3,4-dihydroisoquinoline hydrochloride, M.P. 143° C.
1-propargylamino-6,7-dichloro-3,4-dihydroisoquinoline hydrochloride hemihydrate, M.P. 280–2° C.
1-hydroxyamino-3,4-dihydroisoquinoline hydrochloride, M.P. 220–1° C.
7-chloro-3,4-dihydroisoquinol-1-yl cyanamide, M.P. 223–4° C.
1-(3'-hydroxypropylamino)-7-chloro-3,4-dihydroisoquinoline hydrochloride, M.P. 171–2° C.
10-chloro-3,4,6,7-tetrahydro-2H-pyrimido[2,1-a]isoquinoline hydrochloride, M.P. 358–60° C.
1-(3'-chloropropylamino)-7-chloro-3,4-dihydroisoquinoline hydrochloride. (Required C, 48.6; H, 5.1; N, 9.5. Found C, 48.6; H, 5.2; N, 9.3.)
1-ethoxycarbonylhydrazino-3,4-dihydroisoquinoline M.P. 166–7° C.
d-3-methyl-1-cyclopropylamino-3,4-dihydroisoquinoline B.P. 117° C./0.3 mm.
3-oxo-2,3,5,6-tetrahydro-s-triazolo[3,4-a]isoquinoline M.P. 207–8° C.
1-ethoxycarbonylhydrazino-7-chloro-3,4-dihydroisoquinoline hydrochloride, M.P. 290–1° C.

In the following examples of pharmaceutical compositions, the term "medicament" is used to indicate the compound 1 - cyclopropylamino-3,4-dihydroisoquinoline hydrochloride. That compound may of course be replaced in these compositions by any other compound of the invention and the amount of medicament may be increased or decreased as is well known in the art depending on the degree of activity of the medicament used.

EXAMPLE 23

Tablet formulation

| | Mg./tablet |
|---|---|
| Medicament | 15 |
| Lactose | 86 |
| Maize starch (dried) | 45.5 |
| Gelatin | 2.5 |
| Magnesium stearate | 1.0 |

The medicament was powdered and passed through a B.S. No. 100 sieve and well mixed with the lactose and 30 mg. of the maize starch, both passed through a B.S. No. 44 sieve.

The mixed powders were massed with a warm gelatin solution prepared by stirring the gelatin in water and heating to form a 10% w./w. solution. The mass was granulated by passing through a B.S. No. 12 sieve and the moist granules dried at 40° C.

The dried granules were re-granulated by passing through a B.S. No. 14 sieve and the balance of the starch sieved 44 mesh and the magnesium stearate sieved 60 mesh were added and thoroughly mixed.

The granules were compressed to produce tablets each weighing 150 mg.

EXAMPLE 24

Tablet formulation

| | Mg./tablet |
|---|---|
| Medicament | 100 |
| Lactose | 39 |
| Maize starch (dried) | 80 |
| Gelatin | 4.0 |
| Magnesium stearate | 2.0 |

The method of preparation is identical with that of Example 23 except that 60 mg. of starch is used in the granulation process and 20 mg. during tabletting.

EXAMPLE 25

Capsule formulation

| | Mg./capsule |
|---|---|
| Medicament | 250 |
| Lactose | 150 |

The medicament and lactose were passed through a No. 44 B.S. sieve and the powders well mixed together before filling into hard gelatin capsules of suitable size, so that each capsule contained 400 mg. of mixed powders.

EXAMPLE 26

Suppositories

| | Mg./suppository |
|---|---|
| Medicament | 50 |
| Oil of Theobroma | 950 |

The medicament was powdered and passed through a B.S. No. 100 sieve and triturated with molten oil of Theobroma at 45° C. to form a smooth suspension.

The mixture was well stirred and poured into moulds, each of nominal 1 g. capacity, to produce suppositories.

EXAMPLE 27

Cachets

| | Mg./cachet |
|---|---|
| Medicament | 100 |
| Lactose | 400 |

The medicament was passed through a B.S. No 40 mesh sieve, mixed with lactose previously sieved 44 mesh and filled into cachets of suitable size so that each contained 500 mg.

EXAMPLE 28

Intramuscular injection (suspension in aqueous vehicle)

| | Mg. |
|---|---|
| Medicament | 10 |
| Sodium citrate | 5.7 |
| Sodium carboxymethylcellulose (low viscosity grade) | 2.0 |
| Methyl para-hydroxybenzoate | 1.5 |
| Propyl para-hydroxybenzoate | 0.2 |
| Water for injection to 1.0 ml. | |

The sodium citrate and sodium carboxymethylcellulose were mixed with sufficient water for injection at 80° C. The mixture was cooled to 50° C. and the methyl and propyl para-hydroxybenzoates added followed by the medicament previously milled and sieved 300 mesh. When cool the injection was made up to volume and sterilized by heating in an autoclave.

Having referred to the foregoing disclosure, the following is claimed as the inventive and patentable embodiments thereof:

1. A compound having the formula:

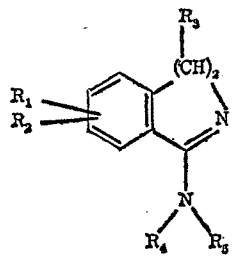

wherein $R_1$ and $R_2$ are selected from the group consisting of hydrogen, halogen and hydroxy, $R_3$ is selected from the group consisting of hydrogen and lower alkyl, $R_4$ is selected from the group consisting of hydrogen and methyl, and $R_5$ is lower cycloalkyl, and nontoxic acid addition salts thereof.

2. A compound of claim 1 in which $R_1$, $R_2$, $R_3$, and $R_4$ are hydrogen and $R_5$ is cyclopentyl.

3. A compound of claim 1 in which $R_4$ is hydrogen.
4. A compound of claim 1 in which $R_4$ is methyl.
5. Compound according to claim 1 having the formula:

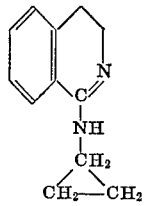

References Cited

UNITED STATES PATENTS

| | | | |
|---|---|---|---|
| 2,593,798 | 4/1952 | Robinson | 260—288 |
| 2,666,059 | 1/1954 | Davis | 260—288 |
| 2,680,057 | 6/1954 | Janes | 260—279 X |
| 2,700,040 | 1/1955 | Ullyot | 260—288 X |
| 2,719,158 | 9/1955 | Druey | 260—288 X |
| 3,101,338 | 8/1963 | Robinson | 260—288 X |
| 3,354,164 | 11/1967 | Francis | 260—288 |
| 3,384,640 | 5/1968 | Muchowski | 260—288 X |
| 3,133,926 | 5/1964 | Kuhre | 260—288 |
| 3,362,956 | 1/1968 | Archer | 260—268 |
| 3,496,166 | 2/1970 | Mull | 260—288 X |
| 3,517,005 | 6/1970 | Cronin | 260—288 X |
| 3,557,120 | 1/1971 | Archer | 260—288 |
| 3,577,424 | 5/1971 | Ehrhart | 260—288 X |

OTHER REFERENCES

Yamasaki et al.: Jour. Pharm. Soc. (Japan), vol. 82, pp. 352–5 (1962).

Mohunta et al.: Jour. Chem. Soc. (London), vol. 1934, pp. 1263–4.

DONALD G. DAUS, Primary Examiner

U.S. Cl. X.R.

260—239 BB, 240.1, 240.7, 243 B, 247.5 B, 251 A, 268 PH, 268 BQ, 2835, 2835 Y, 2835 A, 283 CN, 286 R, 286 Q, 287 R, 429.7, 454; 424—244, 246, 248, 250, 258

UNITED STATES PATENT OFFICE
CERTIFICATE OF CORRECTION

Patent No. 3,652,570      Dated March 28, 1972

Inventor(s) Maurice Ward Gittos, et al.

It is certified that error appears in the above-identified patent and that said Letters Patent are hereby corrected as shown below:

Column 1, lines 60-70 : " 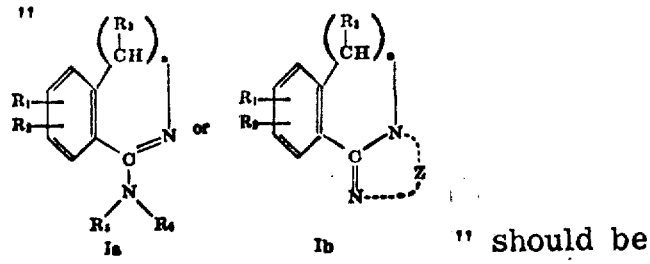 " should be

-- 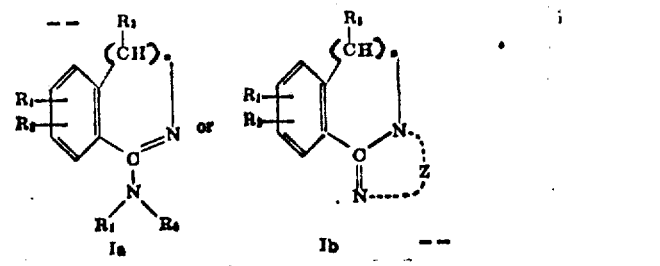 --

Column 2, lines 17-19 : " 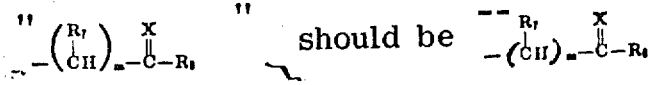 " should be

Column 2, after line 44 insert : --Where the term "alkyl" is used throughout this specification either explicitly as in for example "alkyl-amino" or implicitly as in for example "alkoxy", that term is intended to include straight and branched chain radicals saturated or unsaturated by one or more double or triple bonds.

The term "lower" in qualifying various groups is used herein to

UNITED STATES PATENT OFFICE
CERTIFICATE OF CORRECTION

Patent No. 3,652,570     Dated March 28, 1972

Inventor(s) Maurice Ward Gittos, et al.

It is certified that error appears in the above-identified patent and that said Letters Patent are hereby corrected as shown below:

|  |  |
|---|---|
|  | mean those groups containing up to 6 carbon atoms.-- |
| Column 3, line 12 | : "6-hydroxyhex-1-en-3-yl" should be --6-hydroxyhex-1-en-3-ynyl-- |
| Column 3, line 51 | : "xyly" should be --xylyl-- |
| Column 4, line 15 | : "alkyllower" should be --alkyl lower-- |
| Column 7, line 57 | : "(61.6g)" should be --(61g)-- |
| Column 9, line 21, Example 11 | : "Example 7" should be --Example 8-- |
| Column 13, line 20 | : "referred" should be --regard-- |

Signed and sealed this 27th day of November 1973.

(SEAL)
Attest:

EDWARD M.FLETCHER,JR.
Attesting Officer

RENE D. TEGTMEYER
Acting Commissioner of Patents